Nov. 8, 1927.
F. WOODRUFF ET AL
1,648,669
VOLUME MEASURING APPARATUS FOR LIQUIDS
Filed Jan. 29, 1926
FIG. I.
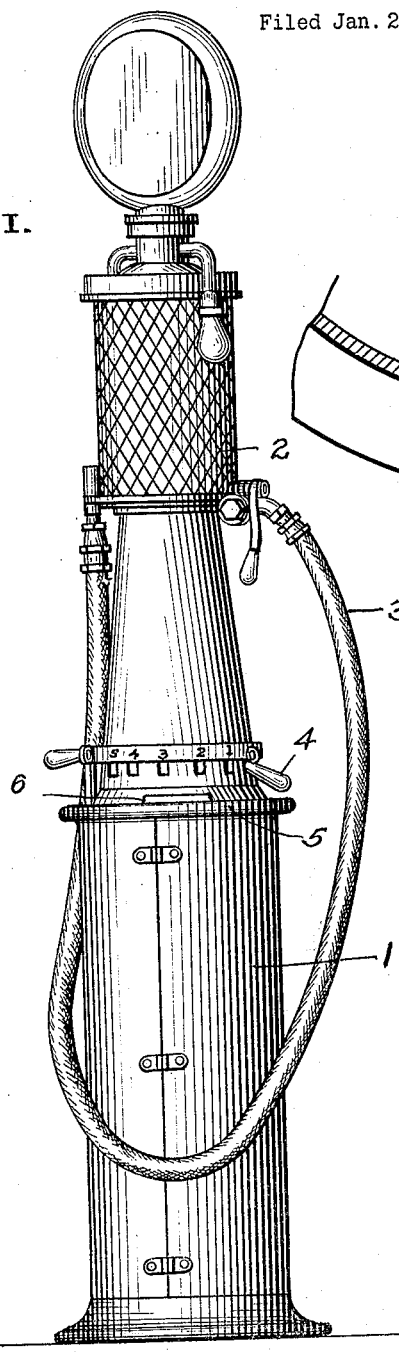
FIG. II.
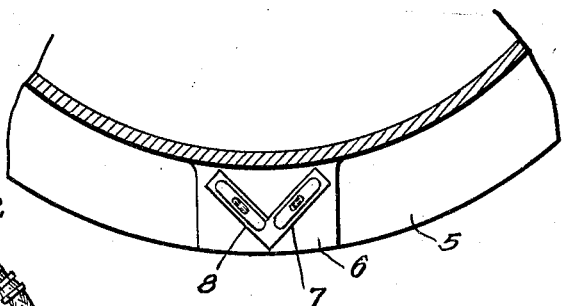
WITNESSES
J. Herbert Bradley.
Percy A. English.
INVENTORS
Frank Woodruff and
John R. Foster by
Christy and Christy
their attorneys Patented Nov. 8, 1927.

1,648,669

UNITED STATES PATENT OFFICE.

FRANK WOODRUFF AND JOHN R. FOSTER, OF ROCHESTER, PENNSYLVANIA, ASSIGNORS TO CORRECT MEASURE COMPANY, OF ROCHESTER, PENNSYLVANIA, A CORPORATION OF PENNSYLVANIA.

VOLUME-MEASURING APPARATUS FOR LIQUIDS.

Application filed January 29, 1926. Serial No. 84,618.

Our invention relates to the installation of fixtures and find specific application in the installation of gasoline-dispensing apparatus. It consists in apparatus so organized and arranged that inaccessible parts may in installation be brought precisely to accurate position.

In the accompanying drawings Fig. I is a view in elevation of a gasoline-dispensing fixture, of the general character now commonly to be found at filling stations along automobile highways; Fig. II is a view to larger scale, showing fragmentarily and in plan a detail of the fixture shown in Fig. I.

The fixture shown in elevation in Fig. 1 includes a hollow pedestal 1 of cast iron, and an elevated measuring chamber 2 of glass. The measuring chamber is cylindrical and stands in vertical position; it is alternately filled and emptied as the apparatus is used; and it is formed of glass that the purchaser may see his desired volume of gasoline, first segregated within it, and then drawn from it to the tank of his car. This measuring chamber is necessarily remote, being raised high on its pedestal 1; its bottom wall in the particular fixture illustrated is seven feet above the ground. And such elevation is necessary, in order to effect delivery by gravity to the tanks of cars elevated at various distances from the ground. A conduit is provided within the hollow base through which gasoline is drawn from a source of supply to the measuring chamber, and a flexible hose 3 is provided, through which a quantity of gasoline segregated in the measuring chamber may be drawn off and delivered to the tank of a waiting automobile. Within the measuring chamber 2 means are arranged whereby, in accurate response to the shifting of a hand lever 4, a precisely determined quantity of gasoline drawn from the source of supply may be carried to and retained in chamber 2 preparatory to delivery to a customer. The particular structure and method of operation of this apparatus for segregating within measuring chamber 2 a predetermined volume of gasoline, does not now concern us.

Each instrument after it has been built and before it leaves the factory is very carefully calibrated and adjusted, to the end that it shall deliver, as required, precisely one, two, three or more units, according to its capacity. And, finding instruments which have so been carefully calibrated affording inaccurate service, we have investigated and found the difficulty to be due to the fact that in installation for service the instrument is not set with minute accuracy, in precisely the position in which it stood when calibrated: it ordinarily leans somewhat from that position. These pieces of apparatus are shipped to users far and wide, and it is more than could be expected that in every case the user should take the care, even if he had the knowledge, to make his installation with careful accuracy in the position of the fixture. It is not a difficult matter within the shop and with shop arrangements to bring the measuring chamber to position with the bottom wall extending in accurately determined horizontal position. All that is needed is a level, and from the staging which in the shop is provided, it is a simple matter to read a level and to make adjustment. But under conditions of installation the measuring chamber is remote, elevated above the level of the eye, and the leveling of the measuring chamber then becomes a matter of difficulty; the necessity of accurate placement may be unrecognized, and even if recognized, is so far neglected or ignored that a rough approximation to correct position is got and no more. The one who makes the installation goes so far, and lets it go at that.

In the practice of our invention we provide at a convenient and less remote place on the pedestal, and at such height as to be at the time of installation fairly in the field of observation, level seats. In the apparatus shown in Fig. I a ledge 5 will be seen, formed intermediate the height of the pedestal 1. On this ledge 5 we provide a boss 6 with extended surface which when installation is made will lie in approximately horizontal plane. In this surface the level seats alluded to are formed. Ordinarily there will be two level seats 7 and 8. They consist of elongate grooves, they extend angularly one to the other, and conveniently they are connected in the right-angular arrangement shown in Fig. II.

When setting up the apparatus in the shop preparatory to calibration we first carefully level the bottom of the measuring chamber.

And, as should have been said above, and as will now be realized, the fixture is at this time an assembled entity, securely bolted part to part, and moves only as an entity. Leveling then is effected by adjusting the jacks or other support upon which the fixture stands. Calibration is effected upon the so leveled instrument. When leveling has so been effected, two levels set in the seats 7 and 8 are adjusted until they both read level, and they then are secured in such positions. These levels will ordinarily consist of the familiar glass tubes incompletely filled with liquid, and they are secured in their seats by being sunk in a plastic and rapidly hardening matrix, such as litharge ground in oil to a paste. When they have been accurately placed and when the litharge matrices have hardened, the levels will remain immovable.

The instrument calibrated and provided with levels set in the manner described is so far ready for installation that, when it is set up in position for service, the levels in seats 7 and 8 are immediately under the eye; the instrument may then be set up in position for service, and may be adjusted in its minute position; leveling may then be readily and accurately effected; and when the levels 7 and 8 read true the instrument may be made secure. The desired end then is gained: the measuring chamber above stands true, as when calibrated, and such inaccuracy in measurement as we hitherto have found in earlier installations to be due to inaccuracy in placement, is avoided and corrected.

We claim as our invention:

1. A fixture supporting rigidly a remote volume-measuring chamber and, less remotely, and rigidly with respect to said chamber, a level, the said level being in its position coordinated to the walls of the measuring chamber.

2. A rigid fixture for the dispensing of gasoline supporting an elevated measuring chamber with bottom wall extending in a plane and having two levels mounted thereon at less elevation than and in fixed position relatively to the measuring chamber and arranged angularly one to another both of said levels arranged in coordinated positions with the bottom wall of the measuring chamber.

In testimony whereof we have hereunto set our hands.

FRANK WOODRUFF.
JOHN R. FOSTER.